US008264729B2

(12) United States Patent
Sugimoto (10) Patent No.: US 8,264,729 B2
(45) Date of Patent: Sep. 11, 2012

(54) IMAGE FORMING APPARATUS PERFORMING FUNCTION RELATED TO EXTERNAL APPARATUS

(75) Inventor: Tetsuya Sugimoto, Muko (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1014 days.

(21) Appl. No.: 12/216,288

(22) Filed: Jul. 2, 2008

(65) Prior Publication Data

US 2009/0021789 A1 Jan. 22, 2009

(30) Foreign Application Priority Data

Jul. 19, 2007 (JP) ................................ 2007-188406

(51) Int. Cl.
*G06K 15/00* (2006.01)

(52) U.S. Cl. ...... 358/1.16; 358/1.9; 358/1.15; 358/1.14; 707/638; 707/695

(58) Field of Classification Search .................... 358/1.1, 358/1.3, 1.9, 1.13, 1.15, 1.16, 1.14; 707/638, 707/695
See application file for complete search history.

(56) References Cited

U.S. PATENT DOCUMENTS

| | | | |
|---|---|---|---|
| 5,278,611 A | | 1/1994 | Ito et al. |
| 6,058,249 A | * | 5/2000 | Matsuda et al. ............. 358/1.14 |
| 6,947,171 B1 | * | 9/2005 | Narusawa et al. ............. 358/1.6 |
| 7,299,494 B2 | * | 11/2007 | Katsuda ............................ 726/7 |
| 7,515,290 B2 | * | 4/2009 | Negishi et al. ............... 358/1.15 |
| 7,826,077 B2 | * | 11/2010 | Tamai et al. ................. 358/1.14 |
| 7,952,739 B2 | * | 5/2011 | Matsumoto .................. 358/1.15 |
| 2003/0090695 A1 | * | 5/2003 | Murata ......................... 358/1.13 |
| 2006/0132851 A1 | * | 6/2006 | Kim ............................... 358/296 |
| 2007/0279689 A1 | * | 12/2007 | Aoki et al. .................... 358/1.16 |
| 2008/0080001 A1 | * | 4/2008 | Yamada ....................... 358/1.15 |

FOREIGN PATENT DOCUMENTS

| | | |
|---|---|---|
| JP | 1-118854 A | 5/1989 |
| JP | 1-118855 A | 5/1989 |
| JP | 1-118856 A | 5/1989 |
| JP | 1-118857 A | 5/1989 |
| JP | 1-230067 A | 9/1989 |
| JP | 2-116864 A | 5/1990 |
| JP | 2005-129007 | 5/2005 |
| JP | 2006-101350 | 4/2006 |

OTHER PUBLICATIONS

Notice of Grounds of Rejection in JP 2007-188406 dated Mar. 3, 2009, and an English Translation thereof.

* cited by examiner

*Primary Examiner* — Twyler Haskins
*Assistant Examiner* — Dennis Dicker
(74) *Attorney, Agent, or Firm* — Buchanan Ingersoll & Rooney PC (57) ABSTRACT

A USB memory stores, as function information, a function of processing a document and a place where the document is registered. An MFP includes a read unit for reading function information from the USB memory inserted into the MFP, a specifying unit for specifying required information from among the function information, an acquisition unit for accessing a server with the use of the specified information to acquire a target document to be processed, a setting unit for making a setting for performing a PullPrint function, which corresponds to the aforementioned function, with the use of the information, and a print control unit for executing a process for printing the acquired document on the basis of the setting made by the setting unit.

9 Claims, 7 Drawing Sheets

IMAGE FORMING APPARATUS PERFORMING FUNCTION RELATED TO EXTERNAL APPARATUS

This application is based on Japanese Patent Application No. 2007-188406 filed with the Japan Patent Office on Jul. 19, 2007, the entire content of which is hereby incorporated by reference.

BACKGROUND OF THE INVENTION

1. Field of the Invention

The present invention relates to an image forming apparatus, and a method for controlling the image forming apparatus. In particular, the present invention relates to an image forming apparatus performing a function related to an external apparatus with the use of information stored in an external memory, and a method for controlling the image forming apparatus.

2. Description of the Related Art

Occasionally, a function of an image forming apparatus such as an MFP (Multi Function Peripheral) has been exerted by a method unique to a user. In such a case, first, parameters required for the exertion of the function by the method are set for the image forming apparatus; thus, the image forming apparatus performs the function. Further, the parameters are changeable for each user or environment in some cases. Therefore, the parameters set for the image forming apparatus must be changed for each user or environment.

Occasionally, the image forming apparatus has been allowed to have a function of administering information for each user or environment. In such a case, the parameters set as described above are held for each user by this function of the image forming apparatus.

Occasionally, the image forming apparatus has been used under such an environment that no user administration is carried out. Specifically, the image forming apparatus is placed in a shop or the like and is used by any number of users. In a case where a certain function of the image forming apparatus used as described above is exerted by the method unique to the user, the user must set the parameters for the image forming apparatus every time in order to allow the image forming apparatus to perform the function. Consequently, there arises a problem of complicated operations. Particularly, it is considered that the function to be exerted herein is a function related to an external apparatus, for example, a function of outputting data stored in an external apparatus. In this case, the user must conduct an operation for setting the parameters, and then conduct an operation for allowing the image forming apparatus to perform the function related to the external apparatus, for example, an operation for allowing the image forming apparatus to access the external apparatus in order to designate data stored in the external apparatus. Consequently, there arises a problem of more complicated operations.

As a technique of facilitating the setting for the image forming apparatus, Japanese Laid-Open Patent Publication No. 01-118854 (hereinafter, simply referred to as "Reference 1") discloses a copying machine configured as follows. That is, when the copying machine is activated in a state where a storage medium such as an IC card is inserted into a main body of the copying machine, an initial mode including a copy magnification, an exposure amount and the like is set for the copying machine on the basis of data for prescribing an operation mode stored in the storage medium.

Even in the case of using the technique disclosed in Reference 1, however, there arises a problem that the user must conduct a predetermined operation in order to set the parameters. For example, the user must insert the storage medium into the image forming apparatus, and then turn the image forming apparatus on. Even in the case of using the technique disclosed in Reference 1, further, there arises a problem that the user must conduct the operation required for exertion of the function after the setting of the parameters.

SUMMARY OF THE INVENTION

The present invention has been devised in view of the aforementioned problems. An object of the present invention is to provide an image forming apparatus capable of performing a function related to an external apparatus without complicated operations, and a method for controlling the image forming apparatus.

In order to achieve this object, according to one aspect of the present invention, an image forming apparatus includes: a connection unit into and from which an external memory is inserted and removed, the external memory storing function information including information regarding a document, information for specifying an external apparatus having the document registered therein, and information for specifying a function related to the external apparatus for processing the document, as well as parameters; a read unit to read the function information from the external memory; and an execution unit to execute a process for the document with the use of the function on the basis of the function information.

According to another aspect of the present invention, a method for controlling an image forming apparatus includes the steps of: detecting insertion of an external memory into a connection unit of the image forming apparatus, the external memory storing function information including information regarding a document, information for specifying an external apparatus having the document registered therein, and information for specifying a function related to the external apparatus for processing the document, as well as parameters; reading the function information from the external memory; specifying the external apparatus and the document on the basis of the function information, and executing a process for the document with the use of the function.

According to the present invention, a user inserts into the image forming apparatus the storage medium which stores the information required for allowing the image forming apparatus to perform the function related to the external apparatus, thereby allowing the image forming apparatus to perform the aforementioned function without complicated operations. In addition, the image forming apparatus can perform the aforementioned function even when the storage medium stores no confidential information. Therefore, it is possible to improve operability while enhancing security.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, hereinafter, description will be given of preferred embodiments of the present invention. In the following description, identical components and constituent elements are denoted by identical reference numerals, and have identical designations and functions.

First Embodiment

Figure 1:
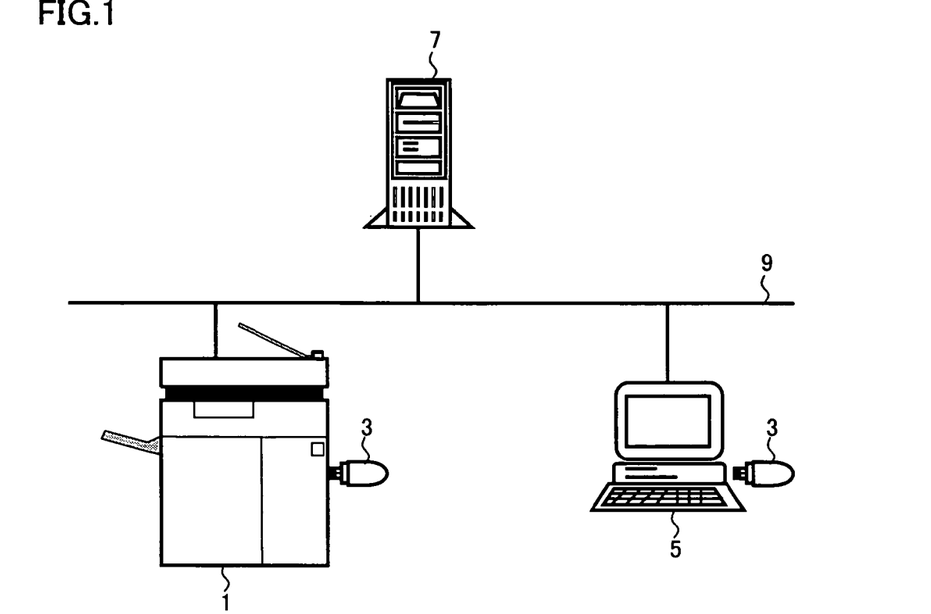
FIG. 1 shows a specific example of a configuration of an image forming system according to one embodiment of the present invention.

With reference to FIG. 1, an image forming system according to one embodiment of the present invention has a configuration that an MFP (Multi Function Peripheral) 1 serving as an image forming apparatus, a PC (Personal Computer) 5 serving as another apparatus and a server 7 serving as an external apparatus are connected to one another through a network 9. A USB (Universal Serial Bus) memory 3 serving as an external memory can be inserted into/removed from each of MFP 1 and PC 5. Each of MFP 1 and PC 5 can read/write information from/to USB memory 3. Herein, the image forming apparatus is not limited to an MFP as long as it has a function of accessing the external apparatus and a function related to the external apparatus. Examples of the image forming apparatus may include a copying machine, an image data transmitting apparatus and the like. Moreover, the external memory is not limited to a USB memory, and examples thereof may include an IC card, a portable telephone having a storage medium such as an IC card incorporated thereinto, and the like. Even in a case where the external memory exchanges information with the image forming apparatus by establishment of either a wired connection or a wireless connection, such a connection is defined as "insertion" of the external memory into the image forming apparatus in this embodiment. Network 9 is of a wired type or a wireless type, and corresponds to a network using the Internet, a network using a special line such as a LAN (Local Area Network) or a network using wireless communications such as Bluetooth (registered trademark).

Figure 2:
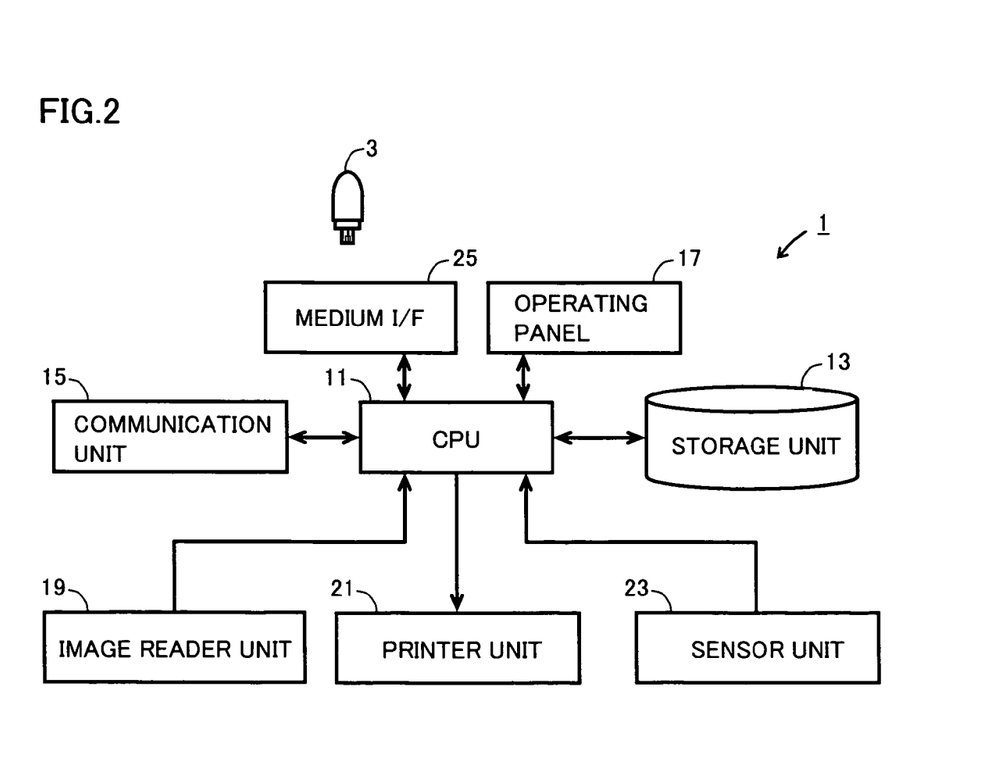
FIG. 2 is a block diagram showing a specific example of a hardware configuration of an MFP (Multi Function Peripheral) according to the embodiment of the present invention.

With reference to FIG. 2, MFP 1 includes a CPU (Central Processing Unit) 11, an image reader unit 19, a printer unit 21, a communication unit 15, a storage unit 13, an operating panel 17, a sensor unit 23 and a medium interface (hereinafter, referred to as a "medium I/F") 25. CPU 11 controls the entire apparatus. Image reader unit 19 reads image data from an original. Printer unit 21 prints an image on a sheet of paper. Communication unit 15 is used for connecting MFP 1 to network 9 or carrying out near wireless communications. Storage unit 13 is an HD (Hard Disk), a RAM (Random Access Memory) or the like, and stores a job, a program such as a line-width control program executed by CPU 11, and the like. Operating panel 17 serves as an interface between MFP 1 and a user. Sensor unit 23 detects a remaining quantity of consumable articles. Medium I/F 25 reads/writes information from/to USB memory 3 inserted into MFP 1

Figure 3:
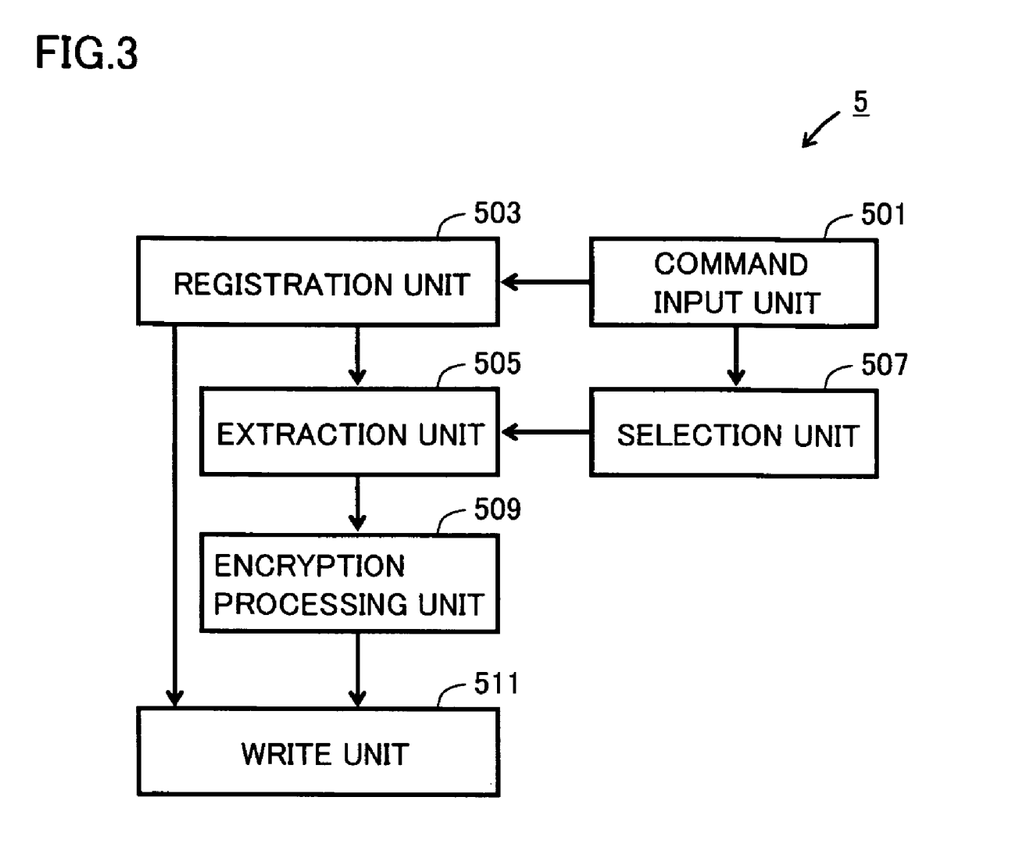
FIG. 3 is a block diagram showing a specific example of a functional configuration of a PC (Personal Computer) according to the embodiment of the present invention.

PC 5 has a hardware configuration similar to that of a typical PC. That is, PC 5 includes a CPU for controlling the entire apparatus, an input unit for inputting an operation, a display unit for displaying information, a storage unit for storing a program executed by the CPU, and the like. FIG. 3 shows functions each of which is mainly realized in such a manner that the CPU (not shown) of PC 5 reads and executes the program stored in the storage unit. Herein, part of the functions may be configured by hardware.

With reference to FIG. 3, the functions of PC 5 include a command input unit 501, a registration unit 503, an extraction unit 505 and a write unit 511. Command input unit 501 inputs an operation signal based on the operation inputted by the input unit. Registration unit 503 executes a process for registering a document in server 7 on the basis of the operation signal. Extraction unit 505 extracts required information from the document registered by registration unit 503. Write unit 511 executes a process for writing to USB memory 3 information regarding server 7 where the document is registered by registration unit 503, information extracted by extraction unit 505, information regarding the user and information inputted by the input unit as for the document while bringing these pieces of information into correspondence with one another. The functions of PC 5 may further include a selection unit 507 and an encryption processing unit 509. Selection unit 507 selects an item of the document extracted by extraction unit 505, on the basis of the operation signal inputted by the command input unit 501. Encryption processing unit 509 encrypts the information extracted by extraction unit 505. In this case, extraction unit 505 extracts information about the item selected by selection unit 507, from the document registered by registration unit 503. Moreover, write unit 511 writes to USB memory 3 the information extracted by extraction unit 505 and encrypted by encryption processing unit 509. For the encryption, encryption processing unit 509 preferably uses an encryption key which is prescribed between PC 5 and MFP 1 in advance.

The information extracted from the document by extraction unit 505 corresponds to information for specifying the document (a document ID) and version information of the document. The information regarding server 7 corresponds to information for specifying a server, more specifically, a server name, and positional information about server 7 on network 9 (e.g., an IP address). The information regarding the user is stored in a predetermined area of the storage unit of PC 5. The information regarding the user corresponds to information required for the use of MFP 1 by the user and information required for the use of server 7 by the user, more specifically, log-in information about MFP 1 and log-in information about server 7. The information inputted by the input unit as for the document corresponds to information for specifying a function of MFP 1 required for processing the document, more specifically, a PullPrint function and a Scan interlock function.

Write unit 511 acquires these pieces of information, brings these pieces of information into correspondence with one another, and writes these pieces of information to USB memory 3. The information to be written to USB memory 3 is constituted of basic data and detailed data. As the basic data, write unit 511 writes to USB memory 3 a designation for specifying the information itself, the information for specifying the function of MFP 1, the log-in information about MFP 1 which is the information regarding the user, and the information for specifying the server. As the detailed data, write unit 511 writes to USB memory 3 information other than the aforementioned pieces of information, herein, information extracted from the document, and the log-in information about server 7 which is the information regarding the user. It is to be noted that the information to be written to USB memory 3 may contain any other pieces of information in addition to the aforementioned pieces of information. For example, the information to be written to USB memory 3 may contain counter information, and information for restricting a frequency and a period of execution of the process for the document.

The information, which is written to USB memory 3 by PC 5 in the registration of the document in server 7, is referred to as function information in the following description. In particular, the function of MFP 1 is characterized by information for specifying the function. If the function is the PullPrint function, information for specifying the PullPrint function is referred to as PullPrint function information.

In the following description, for example, it is assumed that the function to be performed by MFP 1 is the PullPrint function and the information written to USB memory 3 by PC 5 is the PullPrint function information.

Herein, PC 5 may automatically produce function information when the document is registered in server 7, and then write the function information to USB memory 3. Alternatively, PC 5 may write function information to USB memory 3 in accordance with a command inputted by the user. Still alternatively, PC 5 may produce function information in accordance with a command inputted by the user, and then write the function information to USB memory 3. In this case, PC 5 may determine whether or not function information is written to USB memory 3 or designate a type of function information to be written (e.g., a type of a function to be performed), on the basis of a command inputted by the user. Upon detection of insertion of USB memory 3 into PC 5, alternatively, PC 5 may produce function information, and then write the function information to USB memory 3.

Figure 4:
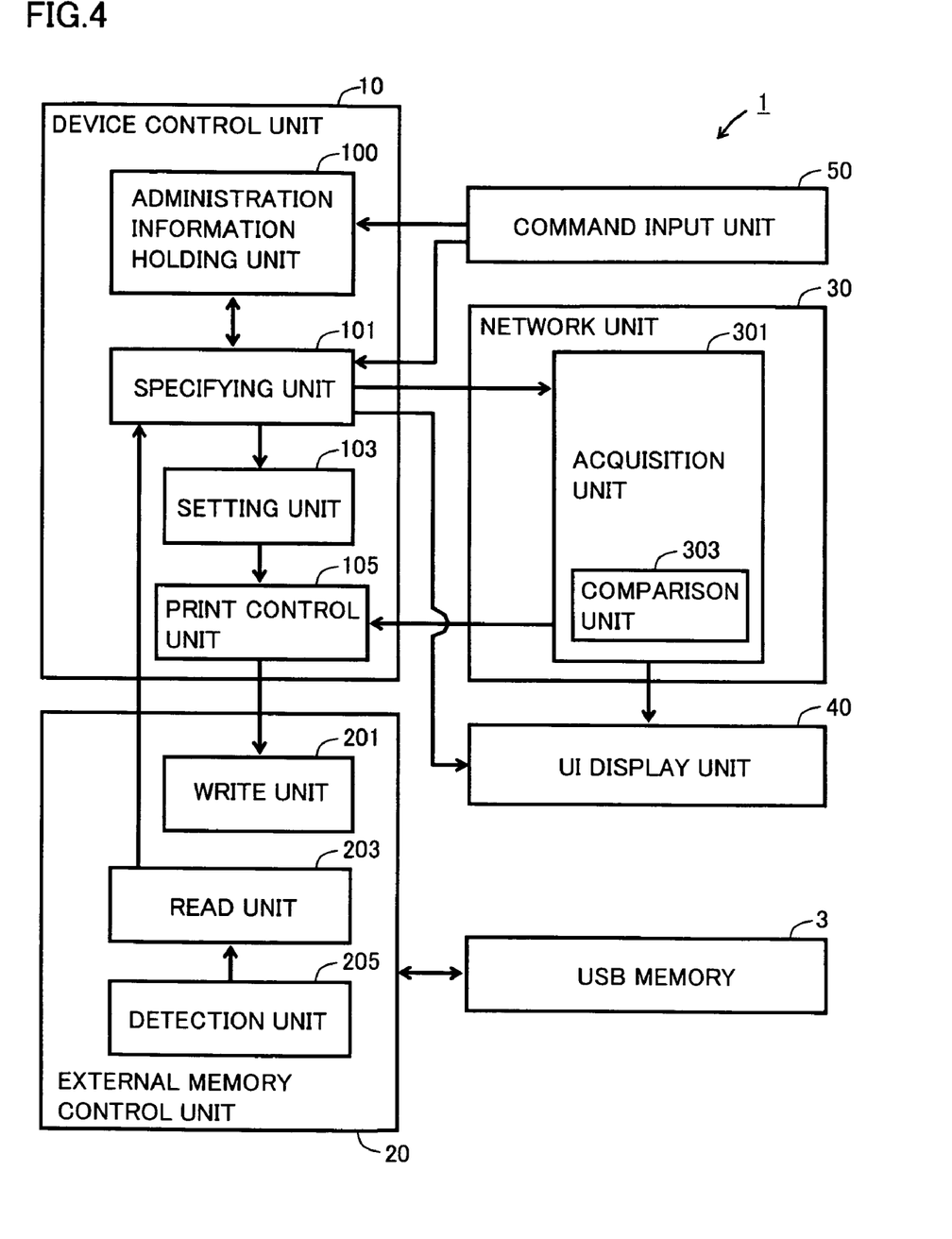
FIG. 4 is a block diagram showing a specific example of a functional configuration of the MFP according to the embodiment of the present invention.

FIG. 4 shows functions of MFP 1, and each function is mainly realized in such a manner that CPU 11 of MFP 1 executes the program stored in storage unit 13. Herein, part of the functions may be configured by the hardware shown in FIG. 2.

With reference to FIG. 4, the functions of MFP 1 largely include a device control unit 10, an external memory control unit 20, a network unit 30, a UI (User Interface) display unit 40 and a command input unit 50. Device control unit 10 executes a process for controlling the apparatus. External memory control unit 20 executes a process for accessing USB memory 3. Network unit 30 is connected to network 9 to execute a process. UI display unit 40 executes a process for displaying a UI on operating panel 17. Command input unit 50 inputs an operation signal based on an operation inputted through operating panel 17.

In addition, device control unit 10 includes an administration information holding unit 100, a specifying unit 101, a setting unit 103 and a print control unit 105. External memory control unit 20 includes a write unit 201 which executes a process for writing information to USB memory 3, a read unit 203 which executes a process for reading information from USB memory 3, and a detection unit 205 which detects insertion of USB memory 3 into MFP 1. Network unit 30 includes an acquisition unit 301 which includes a comparison unit 303. UI display unit 40 includes a display control unit 401.

Read unit 203 of external memory control unit 20 reads from inserted USB memory 3 the function information which is the PullPrint function information written by PC 5 as described above, and then outputs the function information to specifying unit 101 of device control unit 10. Specifying unit 101 specifies required information from the function information. Then, specifying unit 101 outputs the information regarding server 7, the information required for the use of server 7 by the user, and the like, to acquisition unit 301 of network unit 30. Moreover, specifying unit 101 outputs the information regarding the function to be performed (the PullPrint function), the information required for the use of MFP 1 by the user, and the like, to setting unit 103. Acquisition unit 301 accesses server 7 with the use of the received information to acquire the target document to be processed, and then transfers the document to print control unit 105. Setting unit 103 makes a setting for performing the PullPrint function with the use of the received information. Print control unit 105 executes a process for allowing printer unit 21 to print the document acquired by acquisition unit 301 on the basis of the setting made by setting unit 103. Print control unit 105 also executes a process for producing history information on the basis of the aforementioned process. Write unit 201 of external memory control unit 20 writes the produced history information to USB memory 3 while bringing the history information into correspondence with the function information. The history information contains information for specifying the processed document and information for specifying the process. Specifically, the information for specifying the processed document corresponds to information for specifying a server from which the document is acquired, information for specifying the document (e.g., a document ID), a version (an edition) of the document, and the like. The information for specifying the process corresponds to information for specifying the function that was used in the process, that is, the PullPrint function in this embodiment, and information indicating completion of the process, for example, date and time at which a previous process was executed. In addition, the information for specifying the process may contain information regarding date and time at which the PullPrint function information is stored in USB memory 3, an amount of the executed previous process (e.g., the number of printed sheets of paper), and the like.

The administration information is information for prescribing a usable range of the function information read from USB memory 3. Herein, administration information holding unit 100 of device control unit 10 may hold the administration information. In this case, specifying unit 101 specifies information, items, and the like, to be prescribed, on the basis of the administration information held by administration information holding unit 100. The administration information may be inputted or updated through command input unit 50 by a specific user such as an administrator.

Alternatively, the administration information may be information for determining whether or not the information stored in USB memory 3 is used, on the basis of the operation signal from command input unit 50. In this case, specifying unit 101 receives from command input unit 50 the operation signal so as to use the information stored in USB memory 3, and then specifies required information from the information stored in USB memory 3.

Still alternatively, the administration information may be information for determining whether or not the information stored in USB memory 3 is used, on a function basis. For example, if MFP 1 has the Scan interlock function and the PullPrint function, the administration information may prescribe that the Scan interlock function information stored in USB memory 3 is not used, but the PullPrint function information stored in USB memory 3 is used. In this case, if USB memory 3 stores the Scan interlock function information, specifying unit 101 does not use this function information. On the other hand, if USB memory 3 stores the PullPrint function information, specifying unit 101 specifies required information from this function information.

Yet alternatively, the administration information may be information for determining whether or not the information stored in USB memory 3 is used, on a parameter basis. For example, the administration information may prescribe that the information stored in USB memory 3 is used as for parameters such as an IP address of a server and a user name, but the information stored in USB memory 3 is not used as for parameters such as a password (e.g., the log-in information about MFP 1 or the log-in information about server 7). In this case, specifying unit 101 specifies the IP address of server 7 and the user name, from the information stored in USB memory 3. On the other hand, specifying unit 101 does not specify the password from the information stored in USB memory 3 (even when the password is contained in the information stored in USB memory 3). Herein, setting unit 103 requires input of required information (a password herein) in order to set parameters for activation of the specified function (e.g., the PullPrint function).

Yet alternatively, the administration information may be information for prescribing that a process should be executed by preferentially using which one of the function information read from USB memory 3 when USB memory 3 is inserted into MFP 1, the information stored in internal storage unit 13 and the information inputted through operating panel 17, that is, priority. Moreover, the administration information may be information for determining the priority on the basis of the operation signal from command input unit 50.

Figure 5:
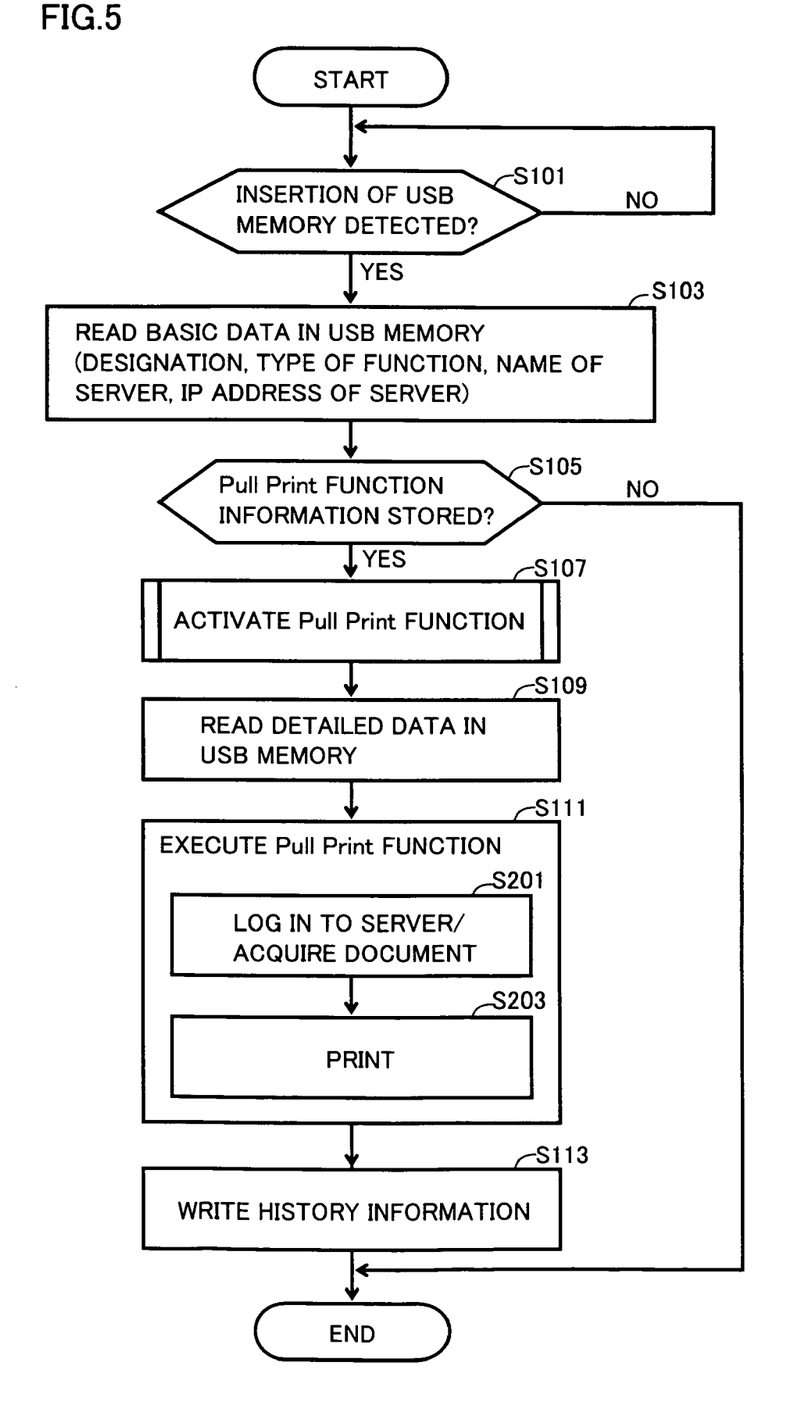
FIG. 5 is a flowchart showing a specific example of a flow of processes executed in the MFP in accordance with a first embodiment of the present invention.

FIG. 5 is a flowchart showing a specific example of a flow of processes executed in MFP 1 in accordance with a first embodiment of the present invention. The processes shown in the flowchart of FIG. 5 are realized in such a manner that CPU 11 of MFP 1 reads and executes the programs stored in storage unit 13 so as to control the respective units shown in FIG. 4.

With reference to FIG. 5, when detection unit 205 of external memory control unit 20 detects insertion of USB memory 3 into MFP 1 (YES in step S101), read unit 203 of external memory control unit 20 reads the basic data from among the function information stored in USB memory 3 (step S103). In step S103, specifically, read unit 203 reads, as the basic data, the designation for specifying the function information itself, the information for specifying the function to be performed by MFP 1, the log-in information about MFP 1 which is the information regarding the user, and the information for specifying server 7 where the document is registered.

It is assumed that specifying unit 101 of device control unit 10 specifies that USB memory 3 stores the PullPrint function information, from the basic data read from among the function information in step S103. In this case (YES in step S105), setting unit 103 makes the setting for activation of the Pull-Print function, and print control unit 105 controls the Pull-Print function. Thus, the PullPrint function is activated (step S107). In step S107, specifically, device control unit 10 executes a log-in process on MFP 1 on the basis of the log-in information about MFP 1 for the user. Herein, the log-in information is specified from the detailed data by specifying unit 101 of device control unit 10. Moreover, print control unit 105 executes a process for activation of the PullPrint function.

It is assumed that specifying unit 101 of device control unit 10 specifies that USB memory 3 does not store the PullPrint function information. In this case (NO in step S105), the processes subsequent to step S105 are skipped; thus, a series of the processes is completed.

Subsequently, read unit 203 of external memory control unit 20 reads the detailed data from among the function information stored in USB memory 3 (step S109). In step S109, specifically, read unit 203 reads, as the detailed data, the information extracted from the document, for example, the information for specifying the document, and the information regarding the user.

Device control unit 10 performs the PullPrint function on the basis of the detailed data read in step S109 (step S111). In step S111, specifically, network unit 30 executes the log-in process on server 7 on the basis of the log-in information about server 7 for the user. Herein, the log-in information is specified from the detailed data by specifying unit 101 of device control unit 10. On the basis of the information for specifying the document (the document ID), which is specified from the detailed data by specifying unit 101, acquisition unit 301 acquires the relevant document (step S201). Thereafter, print control unit 105 executes a process for printing the document acquired in step S201. Thus, the document is printed in MFP 1 (step S203). Thereafter, write unit 201 writes the aforementioned history information to USB memory 3 while bringing the history information into correspondence with the function information, on the basis of the print process executed in step S203. Thus, a series of the processes is completed.

According to the first embodiment, when the aforementioned processes are executed in MFP 1, MFP 1 reads the required information from USB memory 3 to automatically execute the print process. As a result, the user can print the target document with the use of the PullPrint function of the MFP 1 only by insertion of USB memory 3 into MFP 1 without complicated operations including the operation for logging in to MFP 1, the operation for designating server 7, the operation for logging in to server 7, the operation for acquiring the target document to be processed from server 7, and the like. Moreover, PC 5 allows USB memory 3 to store the information for acquiring the target document to be processed, instead of the target document itself. This enables to enhance confidentiality of the document and to improve security. In a case where encryption processing unit 509 of PC 5 encrypts the information extracted from the document, and then writes the encrypted information to USB memory 3, further, read unit 203 of MFP 1 has a function of performing encryption with the use of an encryption key which is prescribed between MFP 1 and PC 5 in advance. With this configuration, it is possible to further improve the security.

Second Embodiment

As a second embodiment of the present invention, next, description will be given of a case where USB memory 3 stores plural pieces of function information in addition to the PullPrint function.

Figure 6:
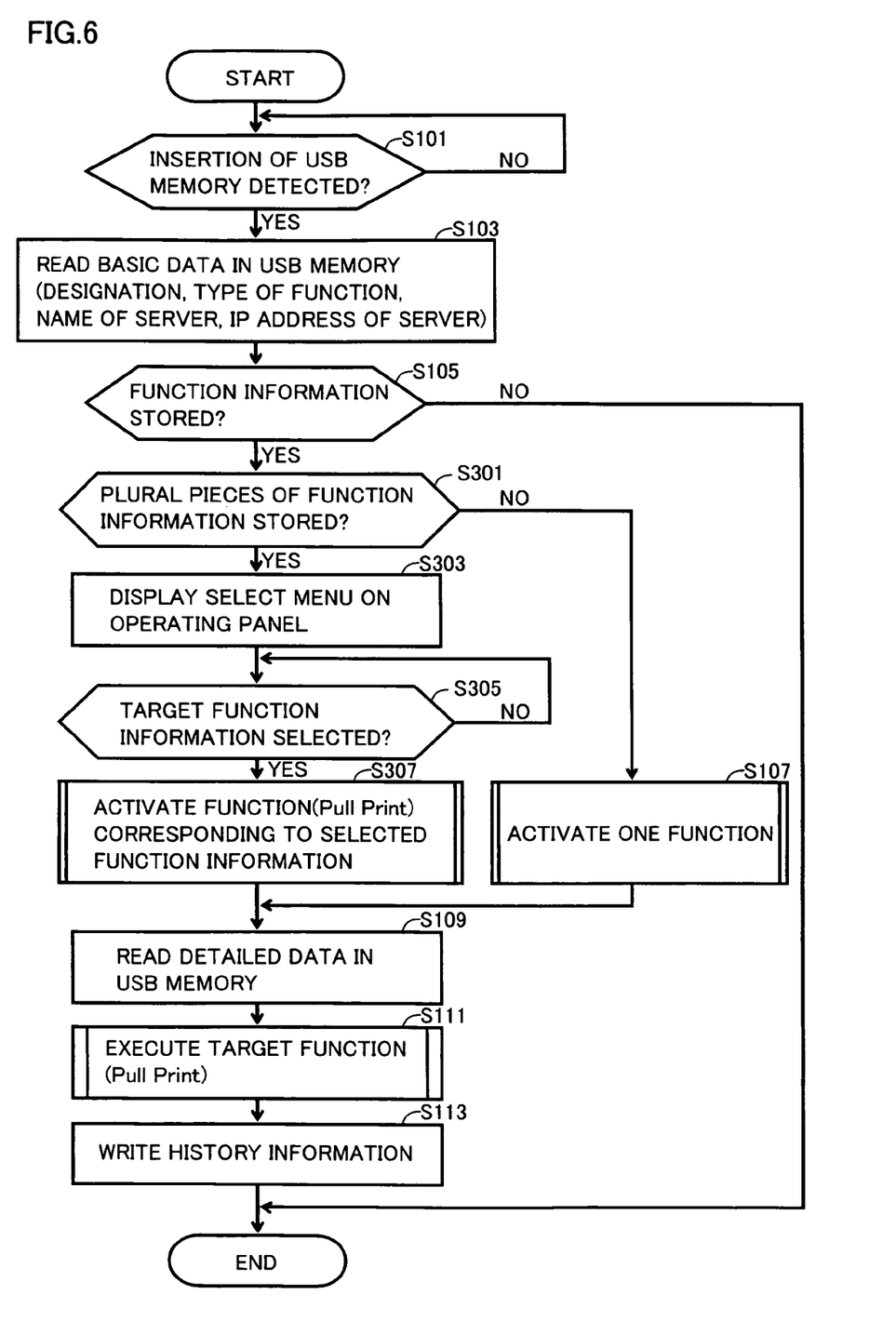
FIG. 6 is a flowchart showing a specific example of a flow of processes executed in the MFP in accordance with a second embodiment of the present invention.

FIG. 6 is a flowchart showing a specific example of a flow of processes executed in MFP 1 in accordance with the second embodiment of the present invention. The processes shown in the flowchart of FIG. 6 are also realized in such a manner that CPU 11 of MFP 1 reads and executes the programs stored in storage unit 13 so as to control the respective units shown in FIG. 4.

With reference to FIG. 6, the processes executed in steps S101 to S105 are similar to those described in the first embodiment. In the second embodiment, USB memory 3 stores the plural pieces of function information including the PullPrint function. In this case (YES in step S301), UI display unit 40 executes a process for displaying on operating panel 17 a select menu for selecting target function information to be processed, on the basis of basic data of each PullPrint function information specified by specifying unit 101 of device control unit 10. As a result, operating panel 17 displays a menu screen shown in FIG. 7 (step S303).

When command input unit 50 inputs an operation signal indicating a command to select target function information to be processed (an operation signal for selecting the PullPrint function herein) (YES in step S305), setting unit 103 makes a setting for activation of the PullPrint function on the basis of the selected PullPrint function information. Print control unit 105 executes a process for allowing printer unit 21 to produce printed output on the basis of the setting made by setting unit 103. Thus, the PullPrint function is activated on the basis of the selected PullPrint function information (step S307).

Thereafter, processes executed in steps S109 to S113 are also similar to those described in the first embodiment. If USB memory 3 stores only one piece of the PullPrint function information (NO in step S301), processes to be executed herein are similar to those described in the first embodiment.

According to the second embodiment, when the aforementioned processes are executed in MFP 1, MFP 1 reads the required information, which has been designated, from USB memory 3 to automatically execute the print process even in a case where USB memory 3 stores the plural pieces of function information. As a result, USB memory 3 can store the plural pieces of function information, and the user can allow MFP 1 to perform the function by selection of the target function information to be processed without complicated operations.

Figure 7:
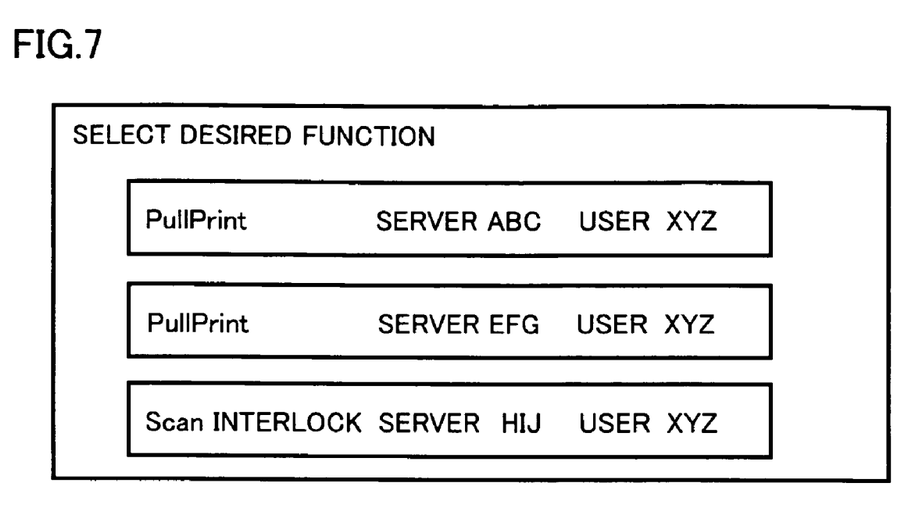
FIG. 7 shows a specific example of a menu screen.

In a case where USB memory 3 stores history information while bringing the history information into correspondence with the function information, the history information may be utilized upon execution of the process for displaying the menu screen shown in FIG. 7 in step S303.

Specifically, the following process may be executed. That is, specifying unit 101 of device control unit 10 specifies date and time at which the PullPrint function information is stored in USB memory 3, from the history information stored in USB memory 3 while being brought into correspondence with the PullPrint function information, for each PullPrint function information. Then, UI display unit 40 executes a process for successive display of select menus on the menu screen in such an order that date and time at which PullPrint function information is stored in USB memory 3, that is, date and time at which PullPrint function is performed is new and vice versa.

Specifically, the following process may also be executed. That is, specifying unit 101 specifies date and time at which a previous process was executed, from the history information stored in USB memory 3 while being brought into correspondence with the PullPrint function information, for each PullPrint function information. Then, UI display unit 40 executes a process for successive display of select menus on the menu screen in such an order that date and time at which a previous process was executed is early and vice versa.

As described above, the order of the select menus to be displayed on the menu screen is determined on the basis of the history information, so that the user can readily select the menu on the menu screen. As a result, it is possible to improve operability in a case where the user must conduct an operation for selecting one of the plural pieces of function information stored in USB memory 3.

In a case where each of the plural pieces of function information stored in USB memory 3 utilizes a function which allows the processes to be executed in parallel, print control unit 105 may execute the following process in place of the processes in steps S303 to S307. That is, print control unit 105 may allow the plural processes corresponding to the plural pieces of function information stored in USB memory 3 to be executed in parallel. In accordance with the order determined as described above, alternatively, print control unit 105 may allow the plural processes corresponding to the plural pieces of function information to be executed sequentially.

Alternatively, administration information holding unit 100 may hold as a default the function to be executed, in advance. In this case, even when USB memory 3 stores the plural pieces of function information, print control unit 105 can execute the function information regarding the function held as a default in administration information holding unit 100, without acceptance of selection of target function information to be processed in the menu screen shown in FIG. 7.

Third Embodiment

As a third embodiment of the present invention, next, description will be given of a case where MFP 1 uses the history information stored in USB memory 3.

Figure 8:
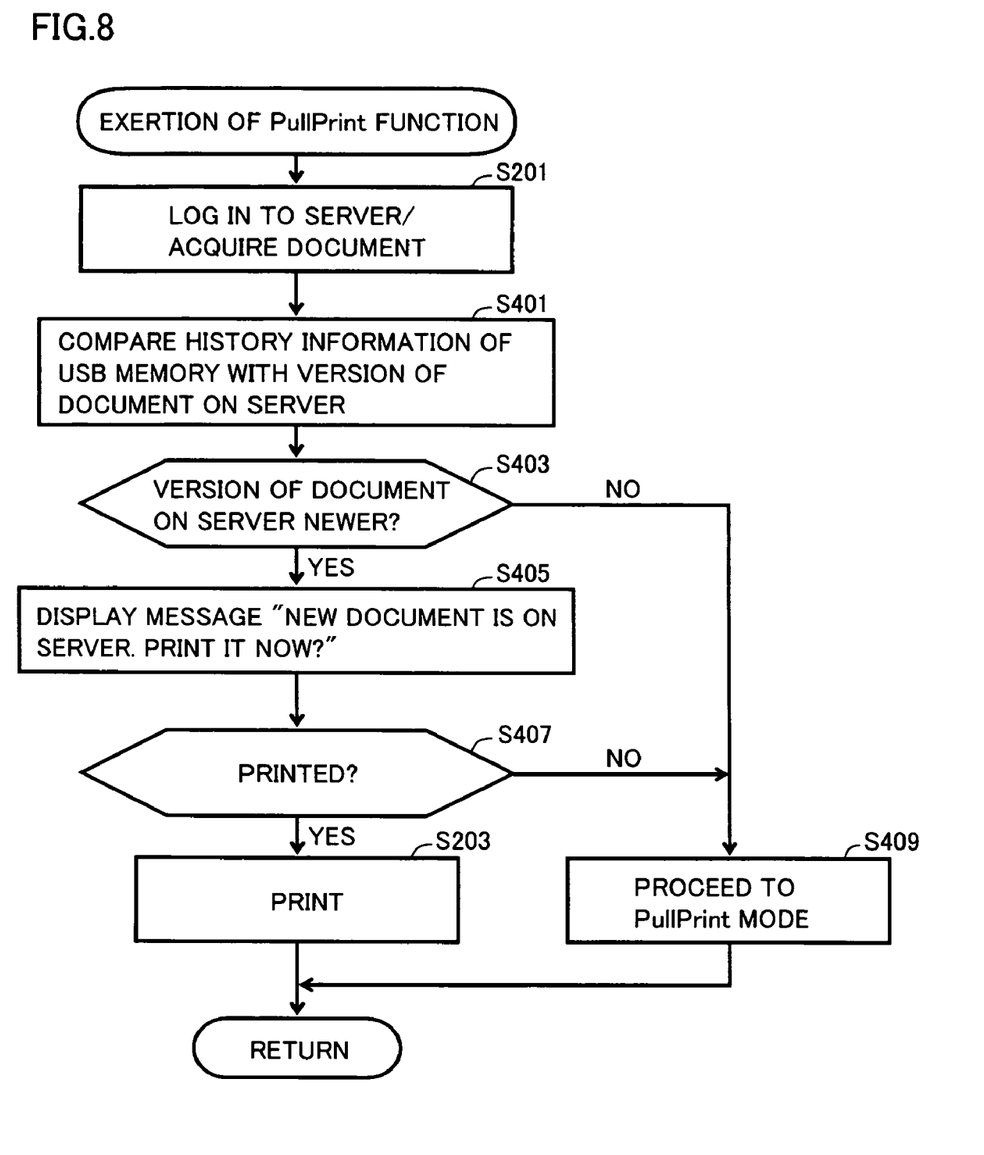
FIG. 8 is a flowchart showing a specific example of a flow of processes executed in the MFP in accordance with a third embodiment of the present invention and showing details of the process in step S111.

FIG. 8 is a flowchart showing a specific example of a flow of processes executed in MFP 1 in accordance with the third embodiment of the present invention and showing details of the process for performing the PullPrint function in step S111.

With reference to FIG. 8, in the third embodiment, the process in step S201 is executed as described above, so that acquisition unit 301 of network unit 30 acquires a document from specified server 7. Comparison unit 303 of acquisition unit 301 compares a version of the document contained in the history information with a version of the document registered in server 7 (step S401). Preferably, the version of the document contained in the history information, which is subjected to the comparison herein, is a version of a document in the previous process.

It is assumed that the version of the document in server 7 is newer than the version of the document contained in the history information, as a result of the comparison in step S401. In this case (YES in step S403), UI display unit 40 executes a process for displaying on operating panel 17 a message "NEW DOCUMENT IS ON SERVER. PRINT IT NOW?", and the like (step S405). When command input unit 50 inputs an operation signal indicating a command to print the document (YES in step S407), the process in step S203 is executed, so that the document of the new version is printed (step S203).

It is assumed that the version of the document in server 7 is not newer than the version of the document contained in the history information, as a result of the comparison in step S401. This corresponds to a case where the version of the document in server 7 is not updated; therefore, the version of the document in server 7 is equal to the version of the document contained in the history information stored in USB memory 3. In this case (NO in step S403), the processes in steps S405 and S203 are not executed, and then the process procedure proceeds to the PullPrint mode activated in step S107 (step S409). Then, device control unit 10 waits for input of the operation signal from command input unit 50. Even when command input unit 50 does not input the operation signal indicating the command to print the document in response to the message displayed on operating panel 17 in step S405 (NO in step S407), similarly, the process procedure proceeds to the PullPrint mode activated in step S107 (step S409).

According to the third embodiment, the aforementioned processes are executed in MFP 1. When the version of the document registered in server 7 is updated, MFP 1 executes the print process for the updated document. When the version of the document registered in server 7 is updated, as a result, the user can print the document with the use of the PullPrint function of MFP 1 only by insertion of USB memory 3 into MFP 1, without complicated operations including the operation for logging in to MFP 1, the operation for designating server 7, the operation for logging in to server 7, the operation for acquiring the target document to be processed from server 7 and the operation for administering the version of the document registered in server 7.

Each of the first to third embodiments describes, as a specific example, the case where the process is executed with the use of the PullPrint function. Alternatively, a function other than the PullPrint function may be used. For example, next, brief description will be given of a case where the Scan interlock function is used instead of the PullPrint function. In this case, similarly, MFP 1 accesses a Scan interlock server where a document is registered, on the basis of information stored in USB memory 3 inserted theremto. Then, MFP 1 outputs a signal to the Scan interlock server so as to allow the Scan interlock server to execute a process based on the information stored in USB memory 3 (e.g., a process for transmitting the document to a predetermined address or a process for storing the document in a predetermined apparatus). When MFP 1 executes such a process, the user can allow the Scan interlock server to execute the process for the target document without complicated operations as described above. The processes in the second and third embodiments can be executed as in the aforementioned manner.

Further, each of the first to third embodiments describes the case where MFP 1 executes the processes based on the information stored in USB memory 3. In a case where the image forming system has an apparatus such as a PC connected to MFP 1, the PC may execute some of the aforementioned processes. Alternatively, PC 5 may execute some of the aforementioned processes. Further, the PC or PC 5 connected to MFP 1 may output a control signal to MFP 1.

The present invention can also provide a program for causing a computer to execute the aforementioned processes in MFP 1. Such a program can be provided as a program product while being recorded on a computer-readable recording medium such as a flexible disk attached to a computer, a CD-ROM (Compact Disk-Read Only Memory), a ROM (Read Only Memory), a RAM (Random Access Memory) or a memory card. Alternatively, such a program can be provided while being recorded on a recording medium such as a hard disk in a computer. Still alternatively, such a program can be provided by a download via a network.

The program according to the present invention may be configured as follows. That is, a process is executed in such a manner that required one of program modules provided as part of an OS (Operating System) in a computer is called in a predetermined arrangement at a predetermined timing. In such a case, the program itself contains no modules, and the process is executed in cooperation with the OS. The program containing no modules is also included in the program according to the present invention.

Alternatively, the program according to the present invention may be provided while being incorporated into part of another program. Also in such a case, the program itself contains no modules to be contained in the another program, and a process is executed in cooperation with the another program. The program incorporated into the another program is also included in the program according to the present invention.

The program product to be provided in the present invention is executed while being installed on a program storage unit such as a hard disk. Herein, the program product includes a program itself, and a recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a connection unit into and from which an external memory is inserted and removed, said external memory storing (i) function information including information regarding a document, (ii) history information containing information indicating a version of said document, (iii) information for specifying an external apparatus having said document registered therein, and (iv) information for specifying a function related to said external apparatus for processing said document, as well as parameters;
   a read unit to read said function information from said external memory;
   an execution unit to execute a process for said document, obtained from said external apparatus, with the use of said function on the basis of said function information; and
   a write unit to write a process history, which indicates a version of said document, to said external memory when said execution unit executes said process, wherein
   said execution unit, prior to executing said process, compares a version of said document contained in said history information with a version of said document registered in said external apparatus, and executes said process when the version of said document registered in said external apparatus is newer than the version of said document contained in said history information.

2. The image forming apparatus according to claim 1, further comprising:
   a setting unit to set whether said execution unit uses said function information for each function of said image forming apparatus, the function being related to said external apparatus.

3. The image forming apparatus according to claim 1, further comprising:
   a setting unit to set whether said execution unit uses said function information for each parameter.

4. The image forming apparatus according to claim 1, further comprising:
   a display unit to execute a process for displaying a select menu as for the plural pieces of function information read by said read unit from said external memory, on the basis of said process history; and
   a selection unit to select target function information to be processed from said select menu.

5. The image forming apparatus according to claim 1, further comprising:
   an operation input unit;
   an internal storage unit; and
   a designation unit to designate a priority of said function information from said external memory, input information from said operation input unit, and information stored in said internal storage unit, each used in said execution unit.

6. The image forming apparatus according to claim 1, further comprising:
a display unit to display a select menu as for said plural pieces of function information read by said read unit from said external memory.

7. The image forming apparatus according to claim 6, further comprising:
a selection unit to select target function information to be processed, from said select menu.

8. A method for controlling an image forming apparatus, comprising the steps of:
detecting insertion of an external memory into said image forming apparatus, said external memory storing (i) function information including information regarding a document, (ii) history information containing information indicating a version of said document, (iii) information for specifying an external apparatus having said document registered therein, and (iv) information for specifying a function related to said external apparatus for processing said document, as well as parameters;
reading said function information from said external memory;
specifying said external apparatus and said document on the basis of said function information;
comparing a version of said document contained in said history information with a version of said document registered in said external apparatus;
executing a process for said document with the use of said function when the version of said document registered in said external apparatus is newer than the version of said document contained in said history information; and
writing a process history to said external memory.

9. The image forming apparatus according to claim 1, further comprising:
an obtaining unit to access the external apparatus specified by the function information and to obtain the specified document from the external apparatus.

* * * * *